Nov. 22, 1966 J. R. ANDERSON ETAL 3,287,708

MAGNETIC DATA STORAGE DEVICES

Original Filed Nov. 18, 1957

INVENTORS
JOHN R. ANDERSON &
RICHARD M. CLINEHENS

BY

Louis A Kline
[signature]
THEIR ATTORNEYS

United States Patent Office 3,287,708

Patented Nov. 22, 1966

3,287,708

MAGNETIC DATA STORAGE DEVICES

John R. Anderson, Los Altos, Calif., and Richard M. Clinehens, Dayton, Ohio, assignors to The National Cash Register Company, Dayton, Ohio, a corporation of Maryland Original application Nov. 18, 1957, Ser. No. 696,987, now Patent No. 3,042,997, dated July 10, 1962. Divided and this application Apr. 16, 1962, Ser. No. 187,779
4 Claims. (Cl. 340—174)

This application is a division of United States patent application Serial No. 696,987, filed November 18, 1957, now Patent 3,042,997, and assigned to the present assignee. The present invention relates generally to storage devices and more particularly relates to new and improved high-speed magnetic data storage devices adaptable for use as memory elements in present-day electronic computers and data processors.

Storage devices at present employed in coincident current memory systems are normally in the form of toroidal magnetic cores having a relatively high magnetic remanence and a substantially rectangular hysteresis loop characteristic. A typical memory system utilizing such magnetic cores is shown and described in an article entitled "Digital Information Storage in Three Dimensions Using Magnetic Cores," Journal of Applied Physics, volume 22, page 44, January 1951, by J. W. Forrester. A more recent description is found in an article by Brown and Albers-Schoenberg entitled "Ferrites Speed Digital Computers," page 146, April 1953 issue of "Electronics," published by McGraw-Hill Publishing Company.

Even though toroidal cores are admirably well suited as storage devices, they nevertheless are extremely fragile and quite difficut to fabricate, and require the expenditure of a considerable amount of time and effort in order to be connected into the memory circuit. In an attempt to alleviate these problems, there has been developed a magnetic storage device commonly known as a "twistor" such as shown and described in Patent 3,083,353 of A. H. Bobeck, and in the article entitled "A New Storage Element Suitable for Large-Sized Memory Arrays—The Twistor," by A. H. Bobeck, as found on pages 1319–1340 of the November 1957, issue of "The Bell System Technical Journal." Such a device comprises a length of non-magnetic electrically conductive wire, constituting a common core, and a co-axial layer of saturable ferromagnetic material extruded on the outermost surface of the core. The core, along with the ferromagnetic coating, is simultaneously stretched and twisted, and the ends thereof are thereafter held in a fixed position. As a result of the stretching and twisting, an easy direction of magnetization is established in the coating which is oriented in a helical direction with respect to the longitudinal axis of the core as the threads of a screw.

Such a ferromagnetic coating has been found to possess a substantially high positive and negative magnetic remanence and a substantially rectangular hysteresis loop characteristic. Consequently, selected length portions of the coating, in the direction of twist, are allowed to attain one or the other of two stable states, respectively characterized by a residual positive or negative magnetic remanence. Thus a magnetic field along the direction of twist ±H oersteds switches the length portions from one state to another, whereas a field of $\pm H/2$ oersteds produces only negligible changes in the magnetic remanence.

A plurality of similar coils are separately wound about the coated wire and are positioned in a spaced side-by-side relationship with respect to one another to encompass and thereby define a corresponding plurality of helical path length portions of ferromagnetic material.

Storage of binary information in a selected length portion of the coating is accomplished by sending a first current impulse into the conductive wire of the common core and simultaneously sending a second current impulse into the selected coil, in such directions that the vector summation of the magnetic fields produced by the two coincident currents is equal in magnitude to ±H oersteds and is oriented in the same direction as the twist or easy direction of magnetization of the coating.

During reading of the selected length portions of the coating, either the core or the corresponding coil is pulsed to individually develop a magnetic field of ±H oersteds in the opposite direction from the field developed during storage of the function. In response to the read impulse, a signal is or is not available across the ends of the core or the corresponding coil, depending upon which one was pulsed, according to whether the binary information 1 or 0, respectively, was established in the particular length portion of the coating as represented by its remanent state.

Even though the twistor type of bistable magnetic storage device possesses many apparent desirable features, they are not yet considered commercially acceptable, as they are relatively expensive in requiring quite elaborate and complex extrusion techniques, the use of expensive materials, and an expenditure of a considerable amount of time and effort in order to form the ferromagnetic coating on the core, all of which undesirably add to the prohibitive cost of the finished product.

Therefore, the primary object of the present invention is to devise a new and improved magnetic data storage device which is capable of being fabricated in a simple and economical manner.

Another object of the present invention is to devise a new and improved magnetic data storage device which is capable of being switched at speeds in the order of fractions of a microsecond and still possess all of the aforementioned desirable characteristics.

Still another object of the present invention is to devise a new and improved twistor-type bistable magnetic storage device which does not require the application of a continual longitudinal and/or torsional stress during operation of the device.

In accordance with one aspect of the present invention, such a novel magnetic data storage device comprises an elongated core of electrically conductive material having a concentric layer of ferromagnetic material electroplated on the surface of the core, with the plated core being twisted relative to a longitudinal axis thereof by an amount sufficient to orient the easy direction of magnetization of the ferromagnetic plating in a helical direction with respect to the longitudinal axis of the core.

In accordance with another aspect of the present invention, such a novel magnetic data storage device comprises an elongated core of nonmagnetic material in a state of strain with respect to a longitudinal axis thereof, and a layer of magnetizable material on the surface thereof, the magnetizable material being in a state of strain with respect to the longitudinal axis of the core by an amount opposite in direction from the strain of the core, whereby the easy direction of magnetization of the magnetizable material is oriented at an angle with respect to the core axis.

The novel features of the invention, as well as the invention itself, both as to its organization and as to its method of operation, will be understood in detail from the following description when considered in connection with the accompanying drawing, in which similar reference numerals refer to similar elements, and in which.

Figure 1:
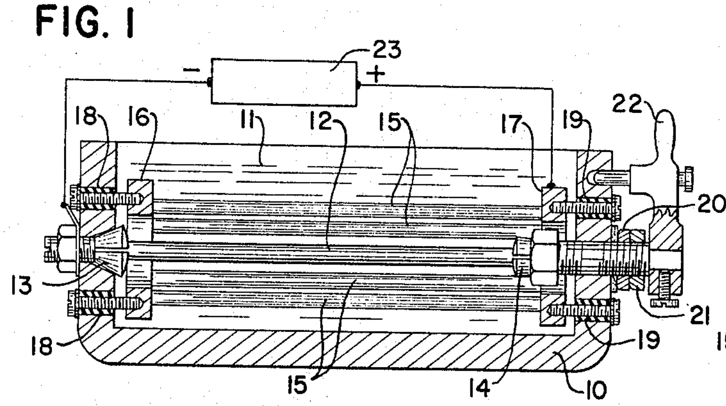
FIG. 1 is a cross-sectional view, partly schematic, of an apparatus utilized by the present invention.
Figure 2:
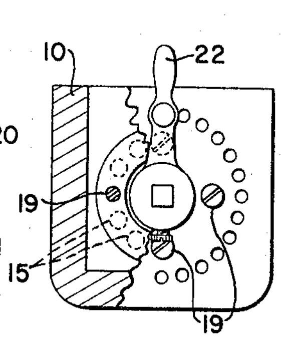
FIG. 2 is an end view, partly in section, of the apparatus shown in FIG. 1.

In accordance with the present invention, a container 10, shown in FIG. 1, is filled with an electrolyte 11 consisiting of an aqueous salt solution of 50 grams per liter of ferrous chloride, 20 grams per liter of nickel chloride, 50 grams per liter of ammonium chloride, and 125 grams per liter of sodium citrate. The pH is maintained at 8.5 with ammonium hydroxide, and the temperature of the solution is maintained preferably at 90 degrees centigrade by any suitable means, not shown, but may be permitted to vary slightly if desired. An electrically conductive nonmagnetic substrate or core, comprising a copper wire 12 having a diameter of approximately .012 inch, is suspended within container 10 by adjustable chucks 13 and 14 fixedly securing its ends against longitudinal and rotational movement. It is to be understood, of course, that various other ductile electrically conductive nonmagnetic materials may be used with equal success so long as they are readily adaptable to electroplating techniques.

A plurality of metallic rods 15, composed of a suitable nickel-iron alloy of, say, 28% iron and 72% nickel, are suspended in the bath by metallic end rings 16 and 17 secured to the opposite ends thereof. The rods 15 are preferably disposed longitudinally in a circular configuration parallel to and equally spaced from one another, and form essentially a cylindrical cage construction concentrically disposed about core 12. The end rings 16 and 17 are each held in a fixed position by bolts 18 and 19, respectively threaded therein, which are secured to but electrically insulated from container 10 by any suitable means. Core 12 is thereafter stretched by an amount to insure tautness thereof by rotation of nut 20 in conjunction with the threaded shaft of chuck 14. Nut 20 is then locked against further rotational movement by lock nut 21 tightened thereagainst. Lever 22, affixed to the shaft extension of chuck 14, is rotated and angularly displaced by an amount approximately equal to 250 degrees per linear inch of the core, preferably not exceeding the elastic limit of the core material.

Figure 3:
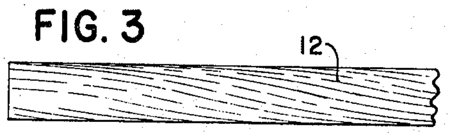
FIGS. 3 and 4 show a novel bistable magnetic storage device in different stages of fabrication.
Figure 4:
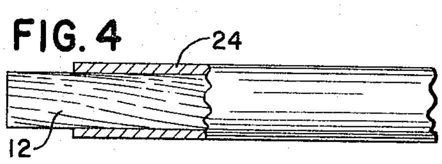

As the core is tautly stretched and twisted, the torsional stress within the molecular structure of the material is oriented in a helical direction about the longitudinal axis of the core, as shown diagrammatically by the dashed lines of FIG. 3. After the streaching and twisting operation is performed on the core, the positive terminal of a unidirectional power source 23 is connected to end ring 17, thence to the rods 15, and the negative terminal thereof is connected to core 12 through chuck 13. Consequently, when supply 23 is energized to initiate the plating operations, core 12 functions as a cathode, and the rods 15, as a unit, function as an anode. Therefore, due to the presence of electrolyte therebetween, an electron discharge path is established between core 12 and rods 15 in a well-known manner such that a coating of nickel-iron alloy is deposited on the outer surface of core 12 of a controlled thickness in accordance with well-known electroplating phenomena. The current density used during the plating process is preferably maintained at approximately 500 amperes per square foot of core material, and the plating current is applied for a time sufficient to deposit a thickness of ferromagnetic material on the core in the order of .0001 inch. It is desirable that the thickness of the coating be as thin as possible, so as to maintain eddy current losses therein at a minimum and yet be thick enough to insure an adequate output and still not fracture when torsional stresses are applied thereto.

Figure 5:
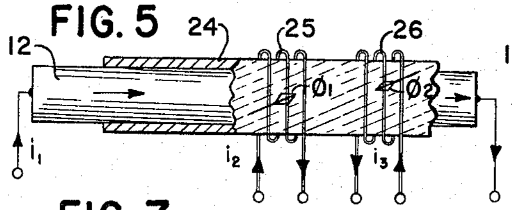
FIG. 5 illustrates a mode of operation of the fabricated device shown in FIGS. 3 and 4.
Figure 6:
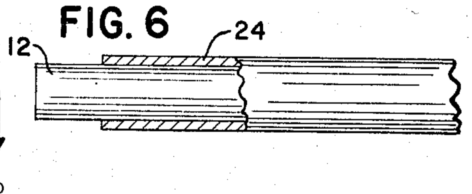
FIGS. 6 and 7 depict another novel bistable magnetic storage device in different stages of fabrication.
Figure 7:
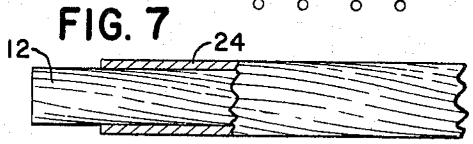

After the core has been plated, it is then removed from chucks 13 and 14 and allowed to approach its original state before being stretched and twisted, as diagrammatically shown in FIG. 5, which has intentionally been exaggerated for purposes of clarity. However, during the return of the core to its original state, the torsional strain established within the core during the original twisting thereof is immediately transmitted to coating 24 in such a manner that the easy direction of magnetization of the coating is oriented in a helical direction with respect to the longitudinal core axis and in an opposite direction from the initial torsional strain of the core, as diagrammatically shown by the dashed lines on coating 24 of FIG. 5. The ferromagnetic coating formed in this manner has been found to possess a substantially high positive and negative magnetic remanent induction and a substantially rectangular hysteresis loop characteristic. Consequently, selected length portions of coating 24 are capable of being magnetized in a helical direction in one or the other of two stable states along the direction of easy magnetization, respectively characterized by the positive or negative remanent induction. A magnetic field along the direction of twist of $\pm$H oersteds is capable of switching each length portion from one magnetic state to another, whereby a field of $\pm H/2$ oersteds produces only negligible changes in the remanent induction.

In operation of such a novel bistable magnetic storage device, a plurality of similar coils, illustratively shown as 25 and 26, are separately wound about the device and are positioned in a spaced side-by-side relationship with respect to one another to encompass and thereby define a corresponding plurality of length portions of ferromagnetic material. As previously described, storage of binary information (for example, a binary 1 in the selective length portion defined by coil 25) is accomplished by sending a current impulse equal in magnitude to ($i_1$) into the conducting wire of the common core 12 and simultaneously sending a current impulse equal in magnitude to ($i_2$) into coil 25 in the directions shown by the arrows. Consequently, the resultant magnetic fields produced by the two coincident currents is equal in magnitude to, say, +H oersteds and is oriented in the same direction as the easy direction of magnetization of coating 24, as shown by $\phi_1$. In order to store a binary 0, for example, impulses of opposite polarity to the polarity for the binary 1 are simultaneously applied to the core and the corresponding coil to produce a resultant magnetic field in the coating in the opposite direction to that in binary 1, as shown by $\phi_2$ in the length portion defined by coil 26.

As before described, sensing of the magnetic remanent state of each of the selected length portions is accomplished simply by pulsing either the core or the corresponding coil. In response to the read pulse, a signal is or is not available in the common core or corresponding coil, depending upon which one was pulsed, according to whether a binary information 1 or 0 had been established in the particular length portion of the coating as represented by its remanent state.

During operation of the device, it has been found that with ambient temperature variations from 70 degrees Fahrenheit to 150 degrees Fahrenheit, the amplitude of the output signal remained substantially constant. With a further increase in operating temperature, the output decreased slowly to approximately 60% of maximum at a temperature of 400 degrees Fahrenheit, all of which is indicative of temperature stability.

Thus, in accordance with the present invention, a new and improved magnetic data storage device is devised which does not require the external application of a continual elongation and/or twisting stress thereto during operation and in addition possesses all the desirable characteristics as before mentioned. In addition, the method of fabricating such devices is extremely simple, requires relatively inexpensive materials and apparatus, and is readily adaptable to automation techniques, thereby maintaining the cost of such devices at a minimum and thus rendering their use commercially acceptable.

Figure 8:
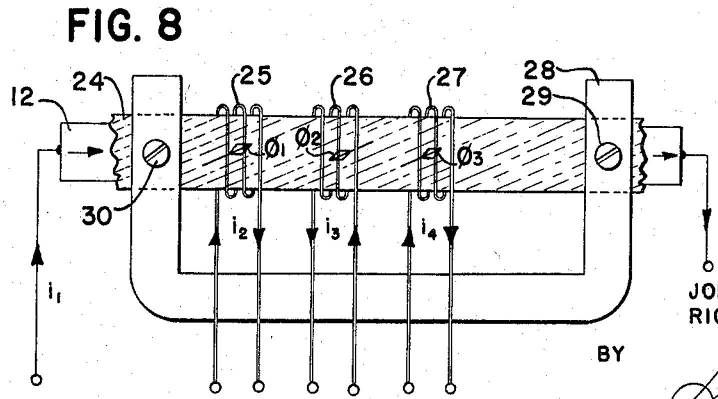
FIG. 8 illustrates a mode of operation of the fabricated device shown in FIGS. 6 and 7.

In accordance with another aspect of the present invention, core 12 is first plated with a ferromagnetic coating of the same thickness and in the same manner as before described. However, in this instance, the plating operation takes place while the core is in an untwisted condition. After the plating operation is completed, the coated core is placed in a jig 28, shown in FIG. 8, and is elongated and twisted as before by any suitable means, not shown. Thereafter, the ends of the device are maintained fixed against longitudinal or rotational movement during operation thereof by action of screws 29 and 30 threaded in jig 28. As the mode of operation of the second fabricated storage device is the same as the one before described, a detailed description thereof is not deemed necessary for a full and complete understanding of the second aspect of the present invention.

The novel bistable magnetic storage device constructed in accordance with the second aspect of the present invention has been found to possess an extremely fast switching time of less than two tenths of a microsecond, which has not heretofore been possible. In addition to the greatly improved switching speed, the device also possesses all of the before-mentioned desirable characteristics, and, again, the method of fabricating such devices is, as before, extremely simple, requires relatively inexpensive materials and apparatus, and is readily adaptable to mass production techniques.

While the forms of the invention shown and described herein are admirably adaptable to fulfill the objects primarily stated, it is to be understood that it is not intended to confine the invention to the forms or embodiments disclosed herein, for it is susceptible of embodiment in various other forms. For example, it is entirely within the purview of the present invention to maintain the core in a state of twist during the plating operation, releasing the core after the plating operation is completed, thereafter twisting the core in an opposite direction to that during plating, and maintaining the core in its finally twisted condition. As a result, a much greater torsional strain is applied to the ferromagnetic coating, and consequently a much greater output is derived during operation of the device than before. Also, it may be desirable to store a definite amount of controlled stress in the ferromagnetic coating during the plating operation, which will additionally add to the output of the device during operation thereof. Again, it will become readily apparent to one skilled in the computer art that such a device is admirably well suited for incorporation in an extremely compact memory matrix simply by winding the operating coils around a bundle of plated cores and then connecting the electrically conductive elements of the cores and the coils in a two coordinate matrix system in a well-known manner.

What is claimed is:

1. A magnetic data storage device comprising: an elongated core of electrically conductive material in a state of torsional strain with respect to a longitudinal axis thereof; and a concentric layer of ferromagnetic material disposed on the surface of said core and in a state of torsional strain with respect to said core axis by an amount related to and opposite in direction from said torsional strain of said core whereby the easy direction of magnetization of said ferromagnetic material is oriented in a helical direction with respect to said core axis.

2. A magnetic data storage device comprising: an elongated core of electrically conductive material in a state of torsional strain with respect to a longitudinal axis thereof; and a concentric layer of ferromagnetic material electroplated on the surface of said core and in a state of torsional strain with respect to said core axis by an amount related to and opposite in direction from said torsional strain of said core whereby the easy direction of magnetization of said plated material is oriented in a helical direction with respect to said core axis.

3. A bistable magnetic storage device comprising: an elongated core of electrically conductive material in a state of angular twist with respect to a longitudinal axis thereof; and a concentric layer of ferromagnetic material disposed on the surface of said core and in a state of angular twist with respect to said core axis by an amount greater than and in the same direction as said angular twist of said core, whereby the easy direction of magnetization of said ferromagnetic material is oriented in a helical direction with respect to said core axis.

4. A bistable magnetic storage device comprising: an elongated core of electrically conductive material; and a concentric layer of ferromagnetic material disposed on the surface of said core and in a state of torsional strain with respect to a longitudinal axis of said core, the amount of torsional strain in said layer being related to the release of a stress which was stored in the core prior to formation of the layer thereon, whereby the easy direction of magnetization of said ferromagnetic material is oriented in a helical direction with respect to said core axis.

References Cited by the Examiner

UNITED STATES PATENTS 3,083,353 3/1963 Bobeck ............ 340—174

OTHER REFERENCES

Publication I, The Bell System Technical Journal, November 1957, volume 36, No. 6, pp. 1319 to 1340.

TERRELL W. FEARS, *Primary Examiner.*

IRVING SRAGOW, *Examiner.*

H. D. VOLK, R. R. HUBBARD, J. MOFFITT, *Assistant Examiners.*